Jan. 12, 1932.   D. E. QUICK   1,840,792
AUTOMATIC DRAIN VALVE
Filed March 13, 1931
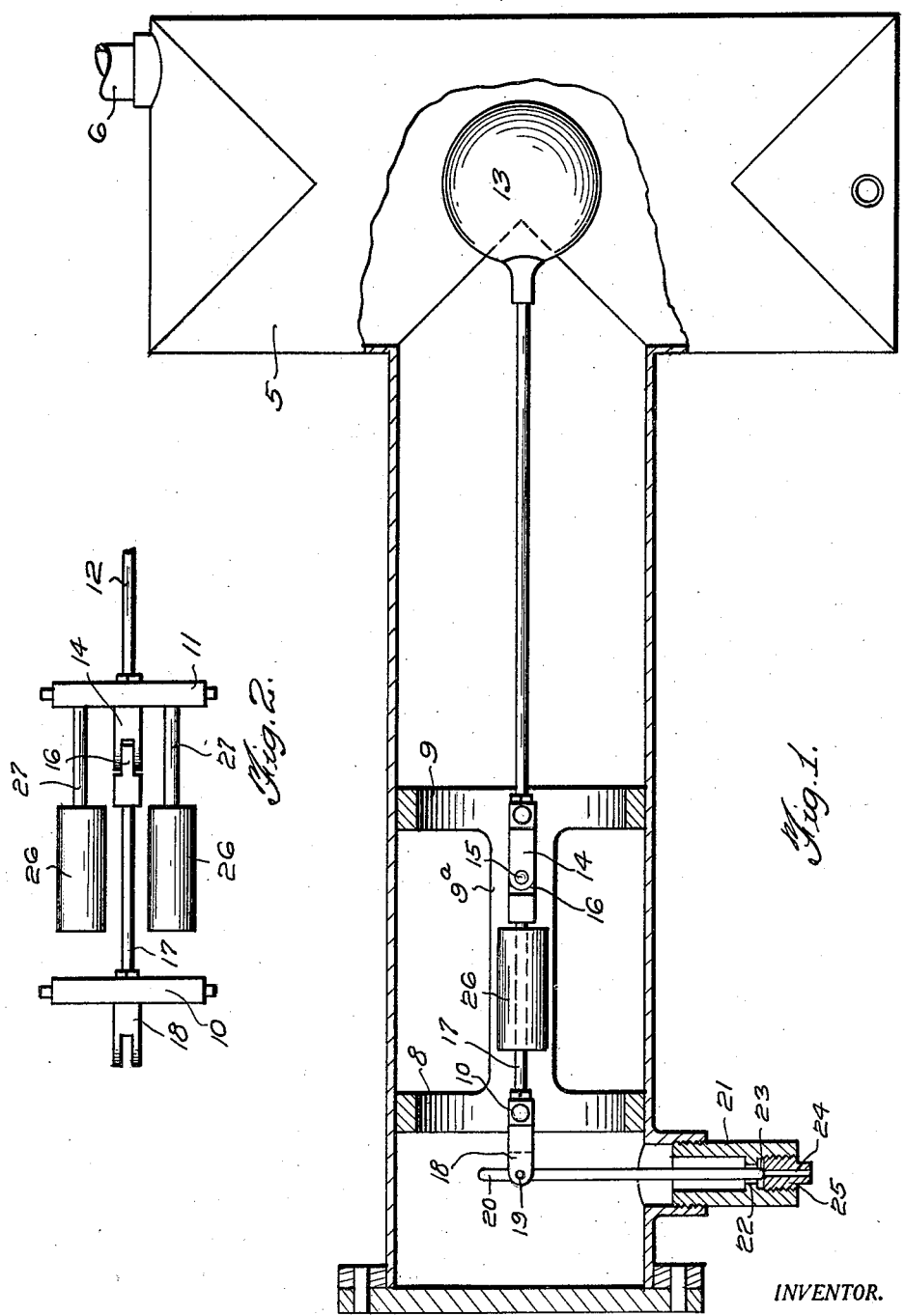
INVENTOR.
D. E. Quick,
BY Samuel Herrick
ATTORNEY.

Patented Jan. 12, 1932

1,840,792

UNITED STATES PATENT OFFICE

DANIEL E. QUICK, OF TAFT, CALIFORNIA

AUTOMATIC DRAIN VALVE

Application filed March 13, 1931. Serial No. 522,427.

This invention relates to automatic drain valves of the character of that shown in Patent #1,597,480, issued to me on August 24, 1926. The object of the present invention is to provide improvements in the structure of the drain valve aforesaid by virtue of which greater reliability in operation is secured and any possibility of the valve sticking or jamming is prevented.

It is a further object of the invention to provide a settling chamber to catch and accumulate sand, stones or any thing that would interfere with proper seating of the outlet valve.

In the accompanying drawings:

Figure 1 is a longitudinal sectional view of a valve constructed in accordance with the invention; and Fig. 2 is a plan view of certain of the valve elements, hereinafter described.

Like numerals designate corresponding parts in both of the figures of the drawings.

In the drawings, 5 designates a collecting casing which may receive water or other liquids from any desired source, such as a steam gas or air line, to be drained, through a pipe 6. A transversely extending casing 7 receives a cage consisting of the two ring-like members 8 and 9 which are joined by ribs 9ª, only one of which is shown. The ring-like members are spanned by the trunnions 10 and 11. A rod 12 projecting rearwardly from trunnion 11 carries a ball float 13 adapted to withstand high pressure of from 500 to 1000 pounds per square inch that is disposed in the chamber 5. A forked end 14 of the rod 12 which lies in advance of the trunnion 11 has pivotal engagement at 15 with the suitably shaped end 16 of a rod 17 which passes through trunnion 10 and is provided with a forked end 18. This forked end 18 has pivotal engagement at 19 with a valve stem 20. A sleeve 21 is threaded into a side or bottom of the casing 7 and has a reduced portion 22 which constitutes a guide for the lower end of the stem 20. The lower end of the stem 20 is shaped to form a valve 23 which controls the discharge port 24 of a valve plug 25 that is threaded into the lower end of the sleeve 21. Counter-weights 26 are disposed between the ring-like members 8 and 9 and are carried by rods 27, said rods being in turn secured to trunnion 11. Thus, these counter-weights 26 counter-balance the weight of the float 13 and render the device much more sensitive in operation than would be the case if these weights were not present. The provision of the vertically arranged receptacle 5 gives the device much greater capacity than was possessed by the device of my prior patent, it being manifest that this receptacle 5 may be increased in size at will and utilized to serve as a storage element for hot water, if desired. An important function of this receptacle is to serve as a settling chamber wherein sand, gravel and like foreign particles are trapped and prevented from reaching the outlet valve.

It will be observed that the arrangement of the parts is such that the movement of the float 13 acts with a multiplied force upon the valve 23. That is to say, the distance between 11 and 13 is so much greater than the distance between 11 and 15 and the distance between 10 and 15 is so much greater than the distance between 10 and 19 that the valve 23 is thrust against its seat with considerable force, it being understood that as the water rises in receptacle 5 float 13 rises, pivot point 15 descends, pivot point 19 rises and the valve is lifted from its seat to permit the excess water or other liquids to be discharged through port 24.

It is to be understood that the invention is not limited to the precise arrangement shown, but that it includes within its purview whatever changes fairly come within either the terms or the spirit of the claims allowed hereunder.

Having described my invention, what I claim is:

1. A device of the character described, comprising a pair of pivoted trunnions, a float arm connected to the outer side of one of said trunnions, a member projecting from the inner side of the same trunnion, a rod projecting from the inner side of the other trunnion and pivoted to said member, a member projecting from the outer side of the last named trunnion, a valve stem pivotally connected to the last named member, a discharge valve carried by said stem, a counter-weight between said trunnions and a member projecting from the inner side of said first named trunnion by which said counter-weight is carried.

2. A device of the character described, comprising a pair of pivoted trunnions, a float arm connected to the outer side of one of said trunnions, a member projecting from the inner side of the same trunnion, a rod projecting from the inner side of the other trunnion and pivoted to said member, a member projecting from the outer side of the last named trunnion, a valve stem pivotally connected to the last named member, a discharge valve carried by said stem, counter-weights disposed between said trunnions, one upon each side of the longitudinal center line of the structure and rods by which said counter-weights are supported from the inner side of the last named trunnion.

3. A device of the character described, comprising a vertically arranged drainage receiving receptacle, a transversely extending casing carried thereby, a cage disposed in said casing comprising a pair of annular members and means connecting the same, trunnions spanning said annular members, a rod passing through one of said trunnions and comprising a long rod-like portion and a short forked end, the latter being disposed inwardly of the trunnion by which it is carried, a float valve upon the other extremity of said rod, a rod passing through the second trunnion and comprising a long end portion disposed inwardly of said second trunnion and a forked end that is disposed outwardly of said trunnion, means for pivotally connecting the inner extremity of the last named rod with the forked end of the first named rod, a valve stem, means for pivotally connecting said valve stem to the forked end of the second named rod, a pair of counter-weights, one upon each side of said second named rod and supported from the inner side of the first named trunnion, as and for the purposes set forth.

4. A device of the character described comprising a float arm and float, a pivotal mounting for the float arm, an element rigid with the float arm and projecting to that side of said pivotal mounting that is opposite to the float arm, a rod pivotally connected to said element and extending in substantially longitudinal alignment with the float arm, a pivotal mounting for said rod, a member rigid with said rod and extending beyond the pivotal mounting of the same upon the side of said pivotal mounting remote from said rod, a valve stem lying substantially at right angles to said member and pivotally connected to said member, and counterweights lying between the points of pivotal mounting of the float arm and rod, respectively, and having rigid connection with the float arm whereby to counterbalance the weight of the float carried by said float arm.

In testimony whereof he affixes his signature.

DANIEL E. QUICK.